United States Patent [19]

O'Brien, Jr.

[11] Patent Number: 4,558,464
[45] Date of Patent: Dec. 10, 1985

[54] ADDRESS-PROGRAMMABLE CATV CONVERTER

[75] Inventor: Thomas E. O'Brien, Jr., Warminster, Pa.

[73] Assignee: General Instrument Corporation, New York, N.Y.

[21] Appl. No.: 757,762

[22] Filed: Jul. 22, 1985

Related U.S. Application Data

[63] Continuation of Ser. No. 502,934, Jun. 10, 1983, abandoned.

[51] Int. Cl.⁴ .................. H04H 1/02; H04N 1/00; H04N 7/167
[52] U.S. Cl. .................................. 455/4; 455/2; 455/5; 358/86; 358/122
[58] Field of Search ........................ 455/2-6, 455/151; 358/86, 114, 122, 123, 194.1; 340/825.07, 825.31, 825.44

[56] References Cited

U.S. PATENT DOCUMENTS

| | | | |
|---|---|---|---|
| 3,806,814 | 4/1974 | Forbes | 455/4 |
| 4,025,851 | 5/1977 | Haselwood et al. | 455/2 |
| 4,322,854 | 3/1982 | Bundens et al. | 358/86 |
| 4,460,922 | 7/1984 | Ensinger et al. | 358/114 |
| 4,461,032 | 7/1984 | Skerlos | 455/4 |

Primary Examiner—Jin F. Ng
Attorney, Agent, or Firm—Hopgood, Calimafde, Kalil, Blaustein & Judlowe

[57] ABSTRACT

An addressable CATV converter for connection with a remote headend in a cable distribution system contains a memory into which a unique address code identifying that converter is downloaded from the remote headend.

10 Claims, 9 Drawing Figures

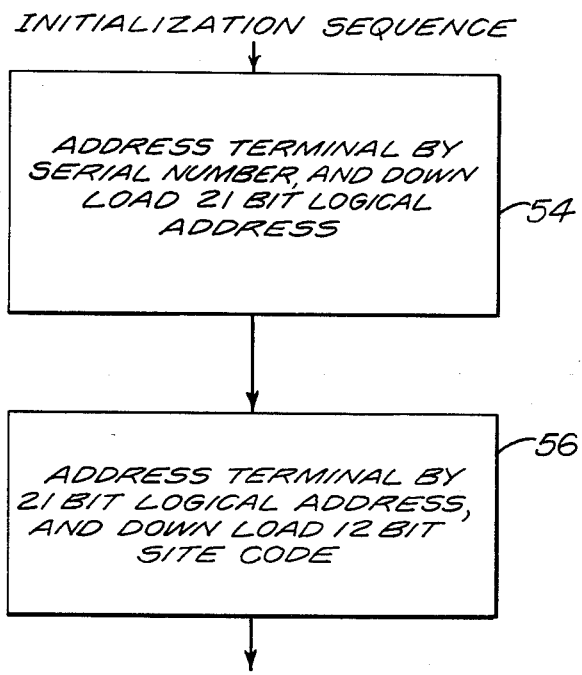

FIG.3

| SEQUENCE TO SET LOGICAL ADDRESS | SEQUENCE TO SET SITE CODE |
|---|---|
| 5 IRG'S (377) | 5 IRG'S (377) |
| BYTE COUNT (014) | BYTE COUNT (013) |
| SET ADDRESS (137) | SET SITE CODE (117) |
| LOGICAL ADDRESS W3 | LOGICAL ADDRESS W3 |
| LOGICAL ADDRESS W2 | LOGICAL ADDRESS W2 |
| LOGICAL ADDRESS W1 | LOGICAL ADDRESS W1 |
| LOGICAL ADDRESS W0 | LOGICAL ADDRESS W0 |
| SERIAL NUMBER DIGITS 10,9 | SITE CODE UPPER 3 BITS (03X) |
| SERIAL NUMBER DIGITS 8,7 | SITE CODE NEXT 3 BITS (02X) |
| SERIAL NUMBER DIGITS 6,5 | SITE CODE NEXT 3 BITS (01X) |
| SERIAL NUMBER DIGITS 4,3 | SITE CODE LOWER 3 BITS (00X) |
| SERIAL NUMBER DIGITS 2,1 | CHECK SUM |
| CHECK SUM | |

FIG.4

FIG.5(a) CLOCK
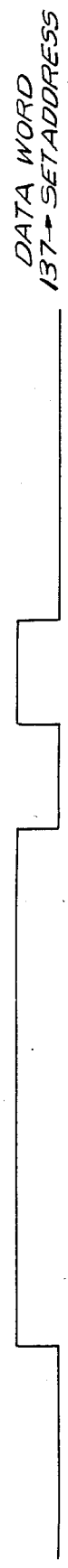
FIG.5(b) DATA WORD 137→SET ADDRESS
FIG.5(c) DATA FRAME
FIG.5(d) ENCODED DATA
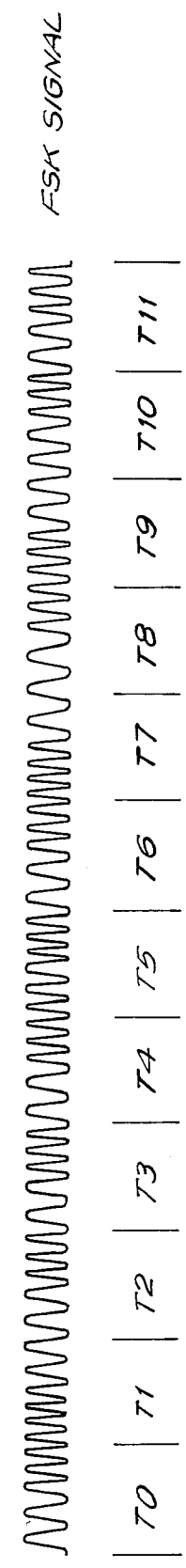
FIG.5(e) FSK SIGNAL
T0 | T1 | T2 | T3 | T4 | T5 | T6 | T7 | T8 | T9 | T10 | T11

ADDRESS-PROGRAMMABLE CATV CONVERTER

REFERENCE TO RELATED APPLICATION

This application is a continuation of U.S. Pat. application Ser. No. 502,934 of Thomas E. O'Brien, Jr., filed June 10, 1983, now abandoned, for ADDRESS-PROGRAMMABLE CATV CONVERTER, the disclosure of which is hereby incorporated by reference.

TECHNICAL FIELD

The present invention relates generally to cable television, and more particularly to a CATV converter into which address information can be downloaded from the system headend.

BACKGROUND OF THE INVENTION

In many modern cable television systems the system operator has the capability of communicating with the plurality of subscriber terminals that are connected via the cable to the system headend via a cable distribution system. In a typical cable system, each subscriber terminal is provided with a converter which is assigned a unique address that permits the headend to communicate with the subscriber to, for example, establish in the converter a program authorization code that determines which pay program or programs that subscriber will be able to receive. In many cable systems, the subscriber is also able to communicate with the headend in a two-way communication link, so as to permit each subscriber terminal to be interrogated or addressed from the headend to, for example, bill the subscriber for viewing special events or poll the subscriber as part of a survey or opinion poll. Such two-way communication also requires that each subscriber terminal be assigned a unique address to permit the headend to be able to identify that terminal with which it is either sending information to or receiving information from.

Moreover, particularly when a relatively large number of subscriber terminals are connected to a headend in a cable transmission system, it is highly advantageous, in terms of saving time, for the headend to be able to address the subscriber terminals in a numerical sequence. This would enable, for example, successively numbered subscriber terminals to be addressed in sequence simply by modifying one or two of the least significant bits of the address code for each subscriber terminal, rather than as many as 21 bits, which may be required when addressing is performed in a nonsequential manner.

The subscriber terminal address is conventionally stored in a programmable read-only-memory (PROM) at or prior to the time the converter is installed at the subscriber's home. This is done in the field by the installer by the use of a PROM programmer. The installer programs the PROM with the preassigned logical address for that subscriber and installs the PROM into a socket provided for the PROM in the subscriber's converter. The subscriber terminal address may also be programmed to store the subscriber's address by cutting selected jumper wires or by operating a series of switches to establish the desired address code in the PROM.

This procedure is, however, time-consuming and costly and inefficient, and must be repeated in the field each time a new converter is installed at a subscriber's home. In addition, it is difficult for the system operator to keep accurate records of the addresses that have been allocated or assigned to the subscribers on the system.

It is accordingly an object of the present invention to provide an addressable cable TV converter in which an unique address can be loaded or stored from a remote headend controller.

It is a further object of the present invention to provide an addressable converter, which, when a plurality are employed in a single cable transmission system, allows the converter to be given sequential address codes.

It is another object of the present invention to provide an addressable converter of the type described which need not be mechanically handled or mechanically modified after its manufacture.

To these ends, the addressable CATV converter of the invention includes a programmable read-only memory in which a unique identification code for the converter is stored, and a random-access memory (RAM) which can be programmed with the unique assigned converter address after the converter is installed at the subscriber location. The converter includes a data receiver which, when the converter is connected to the cable receives from the headend a unique preassigned address code corresponding to the unique identification code stored in the PROM. When the identification code stored in the converter PROM is matched at the converter with the received identification code, the unique preassigned address code is stored into the converter RAM, thereby to enable the headend to thereafter efficiently communicate with the converter.

BRIEF DESCRIPTION OF DRAWINGS

To the accomplishment of the above and such further objects as may hereinafter appear the present invention relates to a programmable addressable CATV converter, substantially as defined in the appended claims and as described in the following specification as considered with the accompanying drawings in which:

FIG. 3 is a flow chart of the initialization sequence used in programming the converter;

FIG. 4 illustrates the format of the data employed to down load or program a logical address and site code into the converter; and FIG. 5 various communication signals in the time domain utilized in the present invention, wherein FIG. 5(a) is the system clock, FIG. 5(b) is the data word format, FIG. 5(c) is the data frame format, FIG. 5(d) is a Manchester encoded data frame, and FIG. 5(e) is the frequency shift keyed (FSK) modulated signal.

DETAILED DESCRIPTION

Figure 1:
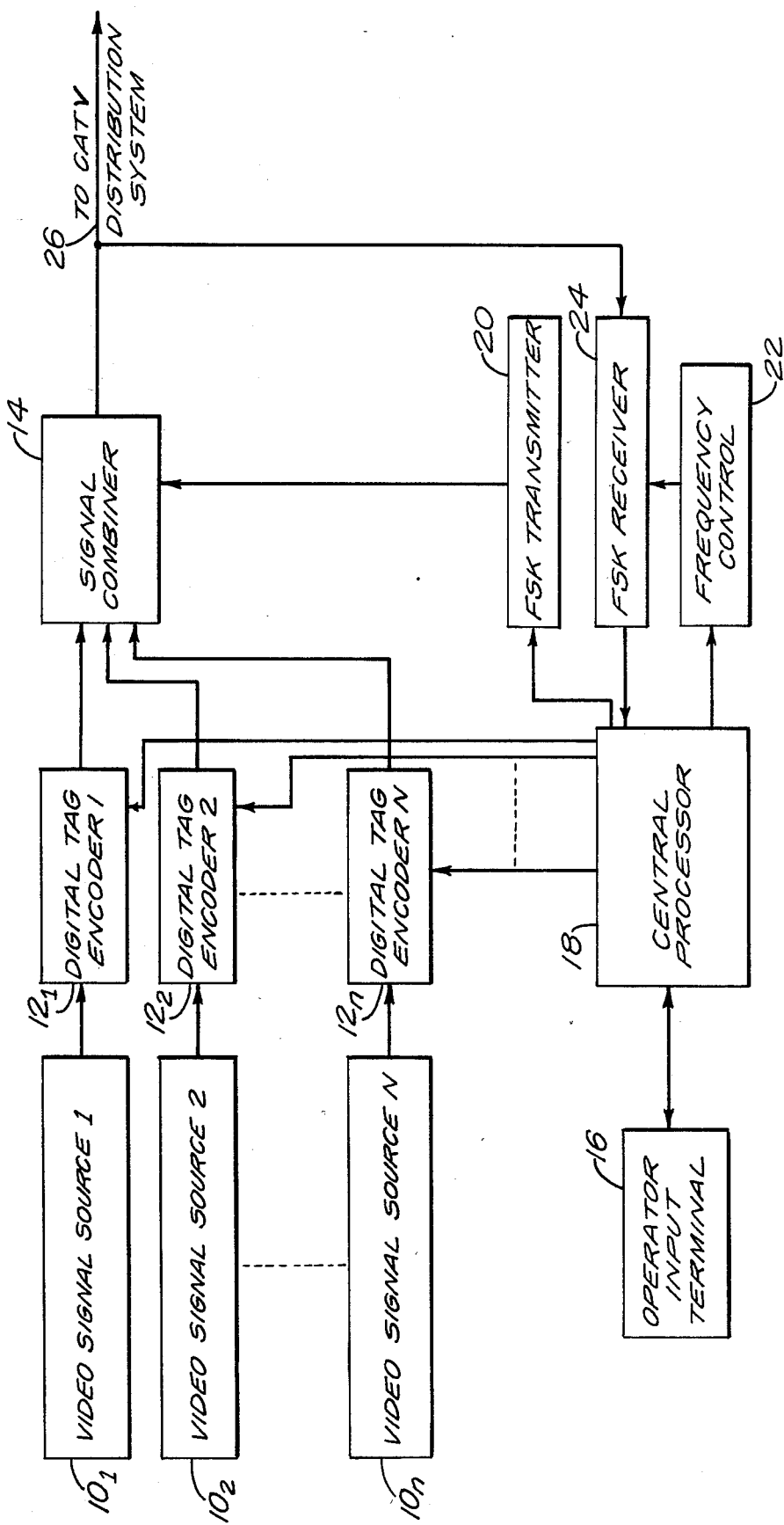
FIG. 1 is a schematic block diagram of a CATV headend for use with the programmable converter of the invention.

The addressable CATV converter of the invention is programmed or downloaded with a unique preassigned logical address from a headend, which may be of the form illustrated schematically in FIG. 1. As therein shown, the headend includes, as is conventional, a plurality of video signal sources $10_1$; $10_2 \ldots 10_n$, the outputs of which are respectively connected to a corresponding plurality of digital tag encoders $12_2$, $12_2 \ldots 12_n$, each of respectively adds a program-identification tag to the video signal outputs of the video signal sources 10. The outputs of the digital tag encoders 12 are applied to the inputs of a signal combiner 14.

The headend of FIG. 1 also includes an operator input computer terminal 16, into which an operator may manually input or type information concerning CATV converters at subscriber locations that are to be connected to the headend through a two-way cable system. Such information includes, for example, the date of installation of the converter; the serial number of the converter; the name and address of the subscriber; the services that are to be allowed to the subscriber, such as HBO or the like; privileges that are to be allowed to the subscriber such as credit and payment for special events to be viewed; and the like.

The information from input terminal 16 is applied to and stored in a central controller or processor 18, which, among its several functions, assigns a digital program tag to each of the digital tag encoders 12. The processor 18 is also programmed to assign for each subscriber converter a unique logical address. The subscriber address may be assigned to the various converters in the system in chronological or sequential order, that is, in the order of their installation.

An output of processor 18 is applied to an input of an FSK transmitter 20, and the other output of processor 18 is applied to a frequency control circuit 22, which controls the local-oscillator frequency of an FSK receiver 24. FSK transmitter 20 produce a Manchester-encoded FSK signal (FIG. 5d), which contains data including logical address codes that are to be transmitted to the converters. The output of FSK transmitter 20 is applied to an input of signal combiner 14. The output of signal combiner 14, which includes the video signals from sources 10 modulated on one group of carrier frequencies, and the FSK signal on another carrier is applied to the two-way CATV distribution system 26 on which the signals are transmitted to the various subscriber terminals. The input to the FSK receiver 24, which receives return information from the subscriber terminals, is connected to the CATV distribution system 26 and its output is applied to the headend central processor 18.

Figure 2:
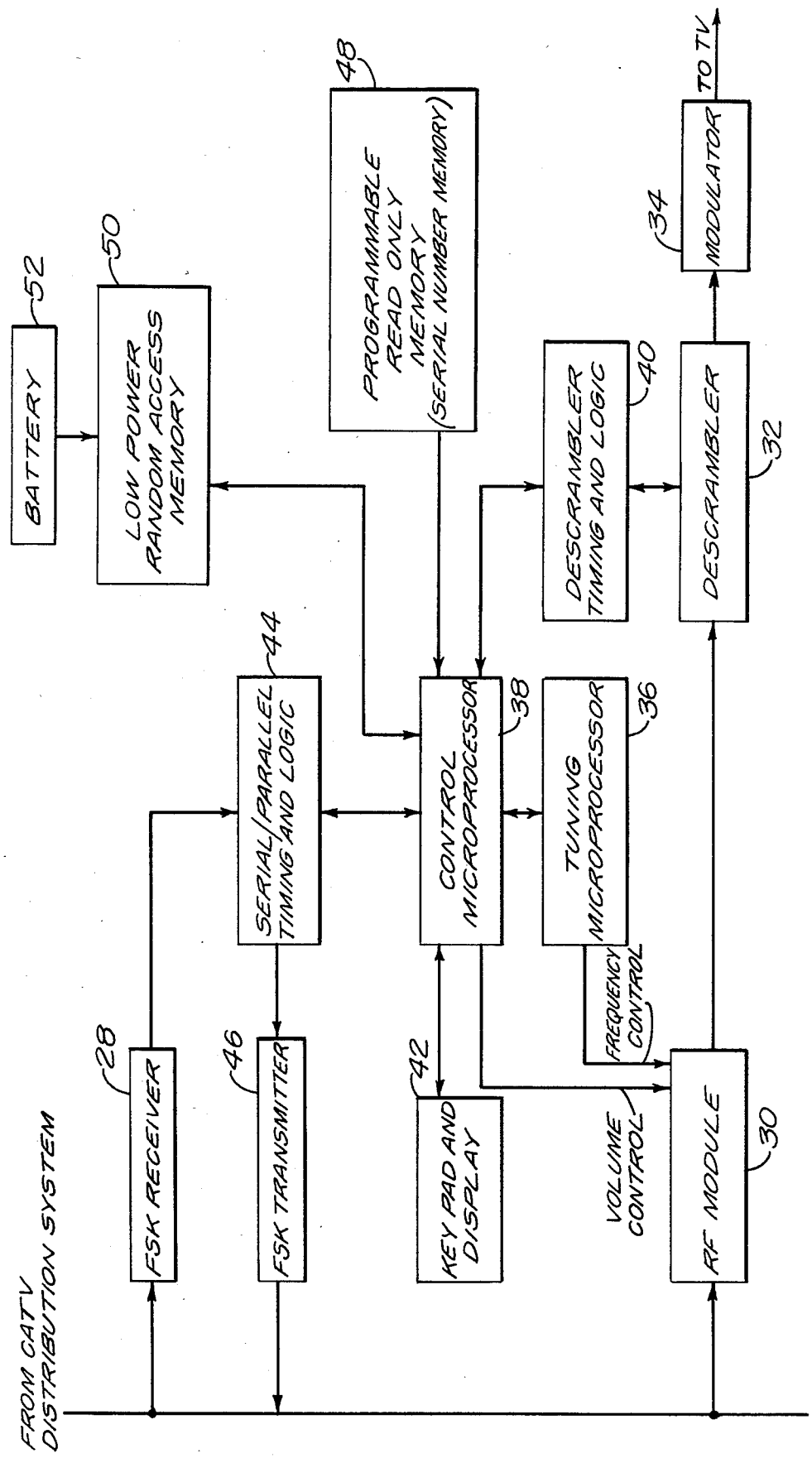
FIG. 2 is a schematic block diagram of a programmable converter in accordance with an embodiment of the invention.

Each of the subscriber terminals connected to the headend via CATV distribution system 26 includes an addressable converter, one of which, embodying features of the present invention, is illustrated in FIG. 2. As therein shown, the converter includes an FSK receiver 28 and an rf module 30 each of which has an input connected via the cable to the two-way distribution system 26. Module 30 detects and demodulates the selected video signal to baseband and applies the baseband scrambled video to a descrambler 32. The latter descrambles the scrambled video and applies an unscrambled video signal at base-band to a modulator 34 in which the descrambled video modulates a carrier at the converter output channel frequency. The output of modulator 34 is applied to the subscriber's television receiver. The signal selection at module 30 is effected by a frequency control signal applied to module 30 from a tuning microprocessor 36, which, in turn, is connected to the converter's control microprocessor 38.

The latter is also adapted to have stored therein an authorization code which allows the subscriber to receive certain programs as identified by the program identification tags added at the headend to the transmitted video signals by the encoders 12. The authorization code is loaded in microprocessor 38 following the assignment of a logical address code to the converter, as described in greater detail below. Microprocessor 38 also provides a volume control signal to rf module 30 and a descramble control signal to a descrambler timing and logic circuit 40, which provides descrambling control signals to descrambler 32. Control microprocessor 38 receives a program select signal from a keypad 42 from which it, in conjunction with microprocessor 36, generates the frequency control signal to rf module 30. Microprocessor 38 provides display 42 with information allowing the selected channel to be displayed.

The control microprocessor 38 receives signals from and provides signals to a serial/parallel timing and logic circuit 44, which, in turn, receives the coded demodulated output from FSK receiver 28. Circuit 44 converts the serial binary data from the FSK receiver to parallel binary data and applies that data to control microprocessor 38. To transmit return data back to the headend from the converter of FIG. 2, control microprocessor 38 provides data through timing and logic circuit 44 to an FSK transmitter 46. The latter modulates the converter binary data onto an rf carrier and transmits the resulting FSK signal along the CATV distribution system 26 back to the FSK receiver 24 at the headend.

What has been thus far described with respect to the converter of FIG. 2 is per se conventional and is accordingly not further described herein. The converter of FIG. 2, in addition can be programmed from the remote headend to download or store into the converter a unique logical address as well as other information.

To this end, each converter is assigned a serial number at the time of its fabrication, which is stored in a programmable read-only memory (ROM) 48 connected to an input of control microprocessor 38. The converter of the invention also includes a low-power CMOS static random-access memory (RAM) 50, which receives operating power and a supply voltage from a battery 52. In a manner to be described below, a unique logical address code, as well as, if desired, a site code and other information concerning that subscriber, such as purchase records, authorizations, and cross-reference tables, can be downloaded from the headend and stored in memory 50 to allow the headend to engage in two-way communication with the subscriber terminal based on an ability to interrogate and recognize the latter's unique logical address. The permanent connection of the battery 52 to memory 50 ensures the non-volatile storage of that information in the converter.

Whenever a converter is to be installed at a remote subscriber location, the control processor 18 at the headend supplies the preassigned address and associated serial number code for the subscriber to FSK transmitter 20. Transmitter 20 transmits an FSK address set command signal (FIG. 5(e), which includes, as shown in the left-hand column of FIG. 4, described in greater detail below, the logical address signal for the converter consisting of 8-bit bytes $W_o$, $W_1$, $W_2$ and $W_3$, and bytes representing the ten digits of the serial number for that converter along with the set address code. That signal is decoded in converter FSK receiver 28, converted into parallel binary form in logic circuit 44, and stored in control microprocessor 38.

Control microprocessor 38 compares the received serial number code and the serial number stored therein. When a match between the received and stored serial number codes is detected microprocessor 38 causes the logical address code associated with the received serial number code to be stored in memory 50. Once the logical address code has been stored in memory 50 as at step 54 in the flow chart of FIG. 3, the headend then, as at step 56, may address the subscriber terminal by its address and transmit a signal having set site code signal, which has the format shown in the right-hand column of FIG. 4 including the address code and the site code. The site code can also be stored in memory 50 along with the converter's unique logical address and other codes such as a program authorization code, that are either unique to that converter or, as in the case of the site code, common to all converters in the system.

The site code stored in the memory 50 of each converter in the system is employed as a security measure. In operation, the headend transmits periodically to each subscriber terminal a signal that contains the system site code, which is compared to the stored site code in each converter. If the transmitted and stored site codes do not match, the control microprocessor 38 in each converter erases the logical address code previously stored in memory 50 so that the subscriber terminal is recognized as containing an unauthorized (e.g. stolen) converter, and all programming to that subscriber is thereafter disabled since the video signal cannot be descrambled at the subscriber terminal.

The commands and data transmitted from the headend to the programmable converter are preferably in the form of a sequence of 8-bit bytes. As shown in FIG. 4, the set logical address signal begins with five 8-bit IRG bytes, shown in octal form as 377 or all "ones" in binary form, which synchronize all converters which are to receive the set address command signals. This is followed by a byte count signal, indicating the number of bytes in the command signal, and then by the set address instruction code. This, in turn, is followed by the four logical address bytes $W_3$, $W_2$, $W_1$ and $W_0$, and the serial number bytes. The signal concludes with a check sum byte, which instructs the converter microprocessor to check to determine if the previous address data has been accurately received. Similarly, the set site code command signal includes the five IRG bytes and a byte count signal followed by the set site code byte, and the logical address and site code bites. A check sum byte is also included to serve as an accuracy check.

FIG. 5 illustrates the manner in which an 8-bit byte signal may be transmitted from the headend to the subscriber terminals in the present system. The specific example illustrated is a command (set address) issued from the headend to all subscriber converters to store the logical address code in the converter memory in the manner described above. FIG. 5(a) is the system clock at approximately 13.895 KHZ, which may be conveniently generated by binary division of a 3.58 mHz color subcarrier signal, which is generated using an available, mass-produced color TV crystal. FIG. 5(b) represents the command code 137 or 01 011 111 in binary code. The 8 bits of the command code occur in 8 time intervals, T2 through T9 with the least significant bit occurring first in time interval T2. FIG. 5(c) shows the data frame format containing the command message. The data frame includes a start bit during time interval T1, an odd parity bit during time interval T10, and a stop bit during time interval T11.

FIG. 5(d) is a Manchester encoded signal wherein the clock signal of FIG. 5a is combined with the data frame signal of FIG. 5(c). The Manchester-encoded signal is generated by an exclusive or logic function between a clock (FIG. 5(a)) and the data frame (FIG. 5(c)). The clock and data are integrated in such manner that there is a waveform transition in the middle of each bit interval. An upward transition (from 0 to logic 1 ) in the middle of a bit interval indicates a logic 1, whereas a downward transition (from logic 1 to logic 0) indicates a logical 0. The Manchester-encoded FSK signal (FIG. 5(e)) transmitted by FSK transmitter 20 in the headend may be at a frequency of 106.5 mHz (in the f.m. band).

It will be appreciated that the unique logical address code and common site code of all converters can be programmed from the remote headend without any mechanical handling or modification to the converter as was required in the prior art addressable converters. It will also be appreciated that other information specific to a converter or common to all converters in the system can also be transmitted from the headend to the converter based on the ability of the headend to communicate with and identify the converter in which a unique address has been stored. It will also be appreciated that once configured with a unique logical address in accordance with this invention, the converter may receive information from the headend in the general format of sequential address values instead of widely dispersed values as would be associated with serial numbers, thereby providing greatly increased efficiency of operations between the headend and subscriber terminals. Finally, it will be appreciated that whereas the invention has been hereinabove described with reference to a presently preferred embodiment thereof, modifications may be made thereto without necessarily departing from the spirit and scope of the invention.

What is claimed is:

1. In a video system including a headend for supplying a scrambled video signal and addressed control information to a plurality of individually addressable subscriber converters, an address-programmable converter in communication with said headend, said converter comprising:

read only memory means for permanently retaining a predetermined identification code uniquely identifying said converter, means for sequentially receiving first and second data sets transmitted from said headend, said first data set including at least a converter identification code and corresponding thereto a logical address code preassigned at the headend, said logical address code being unique to the converter within said system, programmable memory means for storing information transferred thereto, processing means connected to said receiving means, read only memory means and programmable memory means, said processing means including means for operatively comparing said predetermined identification code stored in said read only memory means with said received converter identification code included in said first data set and upon detection of a predetermined relationship between said received and stored identification codes, storing in said programmable memory means said received unique logical address code included in said first data set, said second data set being transmitted from the headend subsequent to the transmission of said first data set, said second data set including at least a converter control code and an address code, said processing means further comprising means for operatively comparing said stored logical address code provided by way of said first data set with said received address code included in said second data set and upon a valid match therebetween, storing in said programmable memory means said control code, the system thereby supplying uniquely addressed control information to a preselected converter on the basis of a unique and programmable logical address provided to the converter from the headend.

2. The converter according to claim 1, wherein said programmable memory means comprises a low-power static random-access memory.

3. The converter according to claim 2, further comprising battery means connected to said random access memory for rendering information store therein non-volatile.

4. The converter according to claim 3, in which said predetermined identification code stored in said read only memory means is the serial number assigned to the converter during its fabrication and wherein said read only memory means comprises a programmable read only memory.

5. The converter according to claim 4, wherein said receiving means comprises an FSK receiver and logic means interposed between said FSK receiver and said processing means for converting received serial binary data to parallel binary data.

6. The converter according to claim 1, wherein said processing means include means responsive to a set address command supplied from said headend with said first data set.

7. The converter according to claim 1, wherein said processing means include means responsive to a set control code command supplied from the headend with said second data set.

8. The converter according to claim 1, wherein said control code comprises a site code common to all converters in said system.

9. The converter according to claim 1, wherein said converter further comprises transmitting means connected to said processing means so as to allow said headend to engage in two-way communication with said converter based on an ability to interogate and recognize said converter's unique logical address supplied by way of said first data set.

10. In a video system including a headend for supplying a scrambled video signal and control information to a plurality of subscriber converters, said control information determining the programming which can be unscrambled by each of said converters, a method of suppplying a site code to a plurality of preselected converters comprising the steps of:

permanently storing in each of converters a unique serial number identifying each of said converters, transmitting from said headend to said converters signals that include said converter's serial numbers and associated address codes uniquely assigned to each of said converters within said system, at said converters, operatively comparing each of said received serial numbers with each of said stored serial numbers and, upon a match therebetween, storing a received address code corresponding thereto in a programmable memory, transmitting from the headend to said converters signals that include each of said converter's address codes and a common site code associated wherewith whereby said site code is uniquely addressed to each of said converters, at the converters, downloading said site code on the basis of said stored address code and storing said site code in said programmable memory, whereby said converters are selectively provided with a site code common to each from the headend.

* * * * *